US 9,241,249 B2

(12) United States Patent
Yang et al.

(10) Patent No.: US 9,241,249 B2
(45) Date of Patent: Jan. 19, 2016

(54) METHODS, SYSTEMS AND APPARATUS FOR PROVIDING NOTIFICATION AT AN AUTOMOTIVE HEAD UNIT THAT A WIRELESS COMMUNICATION DEVICE IS OUTSIDE A VEHICLE

(71) Applicant: GM GLOBAL TECHNOLOGY OPERATIONS LLC, Detroit, MI (US)

(72) Inventors: Linxuan Yang, Oshawa (CA); Jarvis Chau, Markham (CA); Mark A. Manickaraj, Ajak (CA); Neeraj R. Gautama, Whitby (CA); Norman J. Weigert, Whitby (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 214 days.

(21) Appl. No.: 13/953,536

(22) Filed: Jul. 29, 2013

(65) Prior Publication Data
US 2015/0031394 A1 Jan. 29, 2015

(51) Int. Cl.
| H04W 4/04 | (2009.01) |
| H04W 4/22 | (2009.01) |
| H04B 1/3822 | (2015.01) |
| B60R 11/00 | (2006.01) |
| H04W 4/00 | (2009.01) |
| H04W 4/02 | (2009.01) |
| H04L 29/08 | (2006.01) |

(52) U.S. Cl.
CPC ............. *H04W 4/22* (2013.01); *H04W 4/046* (2013.01); *B60R 11/00* (2013.01); *H04B 1/3822* (2013.01); *H04L 67/12* (2013.01); *H04W 4/008* (2013.01); *H04W 4/023* (2013.01)

(58) Field of Classification Search
CPC ........ B60R 11/00; H04W 4/22; H04B 1/3822
See application file for complete search history.

(56) References Cited

U.S. PATENT DOCUMENTS

| 8,395,522 B2 * | 3/2013 | Kweon .................. 340/670 |
| 8,478,257 B2 * | 7/2013 | Oh .................. 455/414.2 |
| 2011/0060496 A1 * | 3/2011 | Nielsen et al. ............ 701/33 |
| 2013/0183957 A1 * | 7/2013 | Iwasaki .................. 455/420 |
| 2014/0244104 A1 * | 8/2014 | Tan ...................... 701/36 |

* cited by examiner

*Primary Examiner* — Van Trieu
(74) *Attorney, Agent, or Firm* — Ingrassia Fisher & Lorenz, P.C.

(57) ABSTRACT

Computer-implemented methods, systems and apparatus are disclosed for providing notification at an automotive head unit (AHU) of a vehicle that a pre-paired consumer electronics device (CED), such as a wireless communication device, is outside a vehicle. When it is determined that the pre-paired CED is not connected to a wireless communication interface of the AHU, a notification can be provided to the AHU indicating that the pre-paired CED is not connected. Positional data from a location message, provided from the pre-paired CED, can then be processed to generate location data and provide the location data to the AHU.

20 Claims, 5 Drawing Sheets

METHODS, SYSTEMS AND APPARATUS FOR PROVIDING NOTIFICATION AT AN AUTOMOTIVE HEAD UNIT THAT A WIRELESS COMMUNICATION DEVICE IS OUTSIDE A VEHICLE

TECHNICAL FIELD

The technical field generally relates to vehicle communications, and more particularly relates to methods, systems and apparatus for providing notification at an automotive head unit (AHU) of a vehicle that a consumer electronics device (CED), such as a wireless communication device, is outside a vehicle.

BACKGROUND

Many vehicles today include on-board computers that perform a variety of functions. For example, on-board computers control operation of the engine, control systems within the vehicle, provide security functions, perform diagnostic checks, provide information and entertainment services to the vehicle, perform navigation tasks, and facilitate communications with other vehicles and remote driver-assistance centers. Telematics service systems, for example, provide services including in-vehicle safety and security, hands-free calling, turn-by-turn navigation, and remote-diagnostics.

On-board computers also facilitate delivery to the driver of information and entertainment, which are sometimes referred to collectively as infotainment. Infotainment can include, for example, data related to news, weather, sports, music, and notifications about vehicle location and nearby traffic. Infotainment can be delivered in any of a wide variety of forms, including text, video, audio, and combinations of these.

Many consumers today regularly use mobile consumer electronics devices, such as smartphones. A frustrating experience that many users have had is when they leave their device at a location, and then depart from that location in a vehicle. For instance, one common scenario might occur when a user is leaving a location and forgets to grab their smartphone only to later realize after arriving at their destination that they do not have their smartphone with them. Another common scenario might occur when a user leaves their smartphone in their vehicle, and leaves the vehicle only to later realize that they do not have it with them. It can be very inconvenient or time-consuming to have travel back to the location or back their vehicle to retrieve their smartphone.

Accordingly, it is desirable to provide methods and systems that can alert a user when they leave their consumer electronics device at a location outside their vehicle or within their vehicle before they travel are too far away. Furthermore, other desirable features and characteristics of the disclosed embodiments will become apparent from the subsequent detailed description and the appended claims, taken in conjunction with the accompanying drawings and the foregoing technical field and background.

SUMMARY

Computer-implemented methods, systems and apparatus for vehicles are provided for providing notification that a consumer electronics device (CED) is or is not with them, and where it is located.

In one embodiment, a system is provided for providing notification that a pre-paired consumer electronics device (CED) is located outside a vehicle and for providing a location of the CED with respect to the vehicle. The system includes an onboard computer system of the vehicle and an embedded network access device (NAD). The onboard computer system includes an automotive head unit (AHU) and a processor. The AHU includes a wireless communication interface that is configured to establish a wireless connection with a pre-paired consumer electronics device (CED) when it is within communication range of the pre-paired CED. The CED is pre-paired with the AHU meaning that it is pre-authorized to establish the wireless connection with the wireless communication interface and exchange information with the AHU. In one embodiment, the wireless connection is a Bluetooth connection such that the pre-paired CED can connect to the wireless communication interface when it is within Bluetooth communication range. The processor is configured to execute a device locator module in response to a trigger event, such as activation of the AHU when the vehicle is started. The device locator module comprises computer-executable instructions that are executable by the processor. The device locator module is configured to determine whether the pre-paired CED is connected to the wireless communication interface.

When it is determined that the pre-paired CED is not connected to the wireless communication interface, the device locator module can provide a notification to the AHU indicating that the pre-paired CED is not connected. Further, the AHU can generate a signal that indicates that the pre-paired CED is not connected to the wireless communication interface, and display a prompt requesting a user input. This user input indicates whether or not the user wants additional information to be obtained that indicates where the pre-paired CED is located with respect to the vehicle. If the user input indicates that the user wants additional information to be obtained, the device locator module can generate a request message to request that additional information, communicate the request message to the wireless communication interface and/or the embedded NAD. In one embodiment, the additional information comprises positional data that specifies the location of the pre-paired CED. The wireless communication interface and/or the embedded NAD (via a telematics server) can then communicate the request message to the pre-paired CED. In response to receiving the request message, the pre-paired CED can determine positional data that specifies the location of the pre-paired CED, generate a location message that comprises the positional data, and communicate the location message back to the wireless communication interface and/or the embedded NAD (via the telematics server). The location message can then be provided to the device locator module, and the device locator module can process the location message to generate location data and provide the location data to the AHU. The AHU includes a display that can be used to present the location data, for example, on a map along with a location of the vehicle to indicate the location of the pre-paired CED with respect to the vehicle.

By contrast, when it is determined that the pre-paired CED is connected to the wireless communication interface, the AHU can generate an indicator that indicates that the pre-paired CED is connected to the wireless communication interface, and display a prompt for a location request input from a user. The location request input indicates whether the user is able to locate the pre-paired CED. When the location request input indicates that the user is not able to locate the pre-paired CED, the device locator module can obtain sensor data from the pre-paired CED that provides additional information regarding the location of the pre-paired CED.

For example, in one embodiment, the device locator module can generate a sensor data acquisition signal (SDAS) to request sensor data from the pre-paired CED. The wireless communication interface and/or the embedded NAD (via a telematics server) can transmit the SDAS to the pre-paired CED. In response to receiving the SDAS, the pre-paired CED can generate and transmit a sensor data signal (SDS) that includes the requested sensor data. The SDS can be received at the wireless communication interface and/or the embedded NAD, and then provided to the device locator module. Upon receiving the SDS at the device locator module, the device locator module can process the sensor data to generate the additional information regarding the location of the pre-paired CED with respect to the vehicle. For example, the device locator module can then process the sensor data to determine the relative location of the pre-paired CED with respect to the vehicle and generate a location signal that provides this location information.

The AHU can process the location signal, and display an indication of the relative location of the pre-paired CED with respect to the vehicle. In one embodiment, the AHU further comprises a navigation system that provides a user interface. The AHU can display the indication of the relative location of the pre-paired CED as a point-of-interest (POI) on a navigation map displayed on the user interface of the navigation system that indicates the position of the pre-paired CED relative to the vehicle, along with a proximity range that indicates an approximate distance of the pre-paired CED from the vehicle.

In another embodiment, a computer-implemented method is provided for providing notification at an AHU of a vehicle that a CED is outside a vehicle and for providing a location of the CED with respect to the vehicle. In accordance with the method, a processor can execute computer-executable instructions of a device locator module to determine whether the pre-paired CED is connected to a wireless communication interface of an automotive head unit (AHU) via a wireless connection.

When it is determined that the pre-paired CED is not connected to the wireless communication interface, a notification can be provided to the AHU indicating that the pre-paired CED is not connected. In addition, a signal can be generated at the AHU that indicates that the pre-paired CED is not connected to the wireless communication interface, and a prompt can be displayed requesting a user input that indicates whether or not additional information is to be obtained that indicates where the pre-paired CED is located with respect to the vehicle. The processor can generate a request message to request that additional information be obtained from the pre-paired CED that indicates where the pre-paired CED is located with respect to the vehicle. The additional information includes, for example, positional data that specifies the location of the pre-paired CED. The request message can then be communicated from another wireless communication interface of the vehicle and/or an embedded NAD of the vehicle (via a telematics server) to the pre-paired CED. The pre-paired CED determines the positional data that specifies the location of the pre-paired CED, and communicates a location message that includes the positional data back to the embedded NAD via the telematics server, and/or a wireless communication interface in the vehicle. The device locator module can then process the location message to generate location data. The AHU can then display a map on a display that includes the location data that indicates the location of the pre-paired CED on along with a location of the vehicle.

By contrast, when it is determined that the pre-paired CED is connected to the wireless communication interface, the AHU can generate an indicator that indicates that the pre-paired CED is connected to the wireless communication interface, and display a prompt for a location request input from a user. The location request input indicates whether or not the user is able to locate the pre-paired CED. When the location request input indicates that the user is not able to locate the pre-paired CED, the device locator module can obtain sensor data from the pre-paired CED that provides additional information regarding the location of the pre-paired CED, and then process the sensor data to determine the relative location of the pre-paired CED with respect to the vehicle. The device locator module can then generate a location signal that provides location information regarding relative location of the pre-paired CED with respect to the vehicle. The AHU can process the locator signal and display an indication of the relative location of the pre-paired CED with respect to the vehicle. In one embodiment, this indication comprises a point-of-interest (POI) on a navigation map to indicate the position of the pre-paired CED relative to the vehicle, and optionally a proximity range that indicates an approximate distance of the pre-paired CED from the vehicle.

In another embodiment, a vehicle is provided that includes an onboard computer system that is configured to communicate with a pre-paired consumer electronics device (CED). The onboard computer system includes an automotive head unit (AHU) and a processor. The AHU includes a wireless communication interface that is configured to establish a wireless connection with the pre-paired CED when in communication range of the pre-paired CED. The processor is configured to execute computer-executable instructions to determine whether the pre-paired CED is connected to the wireless communication interface, and when it is determined that the pre-paired CED is not connected to the wireless communication interface, to provide a notification to the AHU indicating that the pre-paired CED is not connected, and process positional data from a location message, provided from the pre-paired CED, to generate location data and provide the location data to the AHU.

By contrast, when it is determined that the pre-paired CED is connected to the wireless communication interface and that a user is not able to locate the pre-paired CED, the computer-executable instructions of the device locator module, when executed by the processor, are further configured to obtain sensor data from the pre-paired CED that provides additional information regarding the location of the pre-paired CED, and process the sensor data to determine the relative location of the pre-paired CED with respect to the vehicle to generate a location signal that provides location information regarding relative location of the pre-paired CED with respect to the vehicle. The AHU can then process the locator signal, and display an indication of the relative location of the pre-paired CED with respect to the vehicle.

DESCRIPTION OF THE DRAWINGS

The exemplary embodiments will hereinafter be described in conjunction with the following drawing figures, wherein like numerals denote like elements, and wherein.

DETAILED DESCRIPTION

Various embodiments of the present disclosure are disclosed herein. The disclosed embodiments are merely examples that may be embodied in various and alternative forms, and combinations thereof. The following detailed description is merely exemplary in nature and is not intended to limit the application and uses. The word "exemplary" is used exclusively herein to mean "serving as an example, instance, or illustration." Any embodiment described herein as "exemplary" is not necessarily to be construed as preferred or advantageous over other embodiments. As used herein, for example, "exemplary" and similar terms, refer expansively to embodiments that serve as an illustration, specimen, model or pattern. Furthermore, there is no intention to be bound by any expressed or implied theory presented in the preceding technical field, background, brief summary or the following detailed description.

Overview

Before describing some of the disclosed embodiments, it should be observed that the disclosed embodiments generally relate to systems that include a consumer electronics device (CED) (e.g., wireless communication device such as a smartphone), that is pre-paired with a vehicle, such as an automobile, having an onboard computer system that is configured to communicate with the CED. These technologies can automatically alert or notify a person within a short period of time if they have entered a vehicle without their CED depending on whether or not there is a connection (e.g., a Bluetooth connection) between the CED and the onboard computer system of the vehicle. In some embodiments, the onboard computer system can provide a notification to the person that their CED is not with them either before or shortly after the vehicle departs so that they are notified that they do not have their CED with them (e.g., notified that they are driving without their CED).

In some embodiments, these technologies can inform the person of the particular location of their CED so that they can more easily retrieve or find it. For instance, the location of the CED can be determined (e.g., sent from the CED to the vehicle), and the location can then be displayed as a point-of-interest (POI) relative to the vehicle on a display of the vehicle's navigation system. As an example, in one use case, the disclosed technologies can be used to detect when a driver is leaving home without their smartphone, and a notification can be provided to the driver while also displaying Global Positioning System (GPS) location of the smartphone on a navigation map.

Further, in some embodiments, these technologies can use sensor data or information, such as signal strength information, provided from the CED to determine whether or not the CED is located within the cabin of the vehicle or outside the cabin, and then notify the person of the same.

Figure 1:
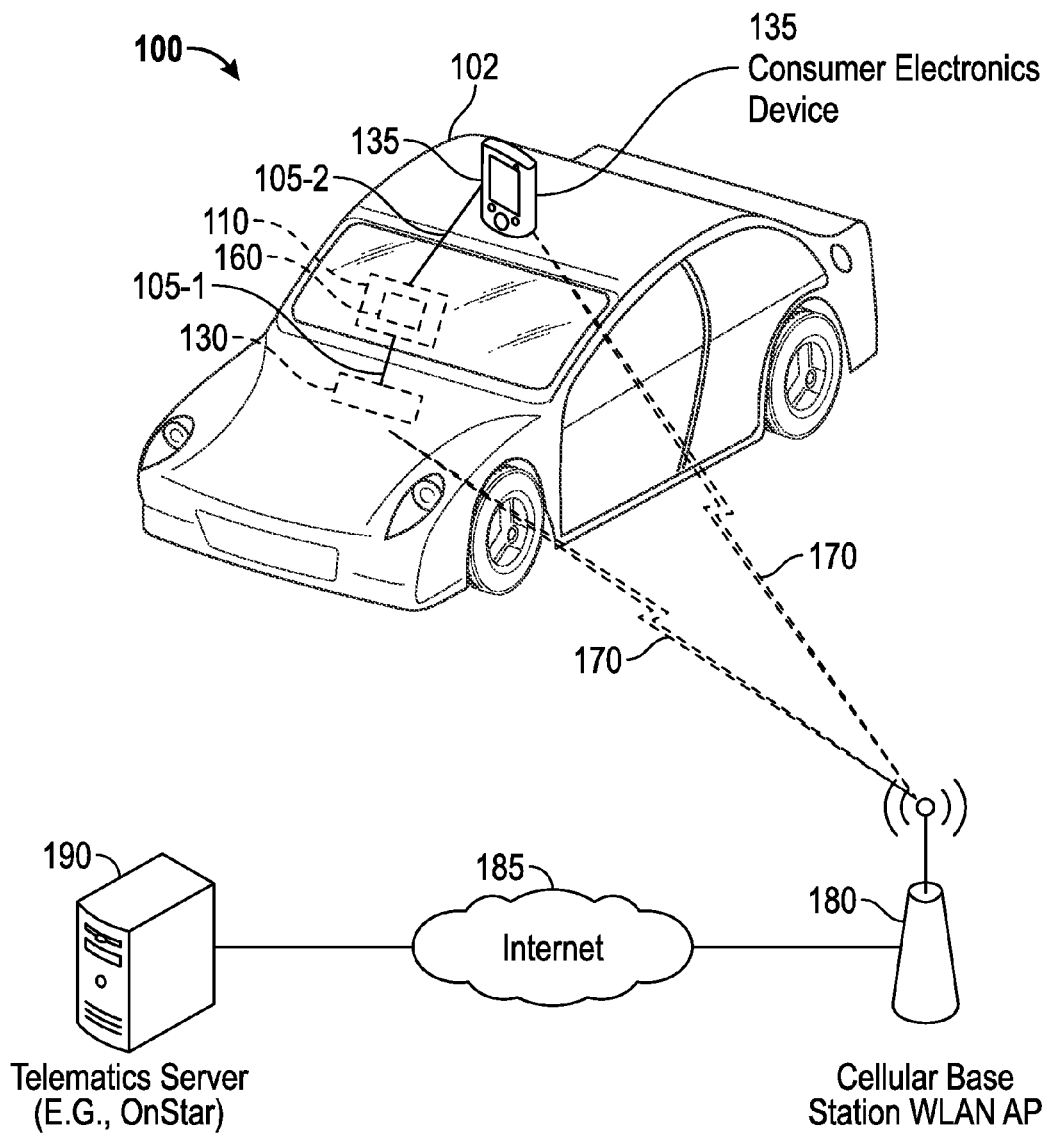
FIG. 1 is a communication system in accordance with some of the disclosed embodiments.

FIG. 1 is a communication system 100 in accordance with some of the disclosed embodiments. The communication system 100 includes a vehicle 102, a consumer electronics device (CED) 135, communication infrastructure 180, a network 185 such as the Internet, and a telematics server 190.

The vehicle 102 includes an embedded network access device (NAD) 130 that is communicatively coupled to an onboard computer system 110 of the vehicle 102.

The onboard computer system 110 includes an automotive head unit (AHU) 160. In one embodiment, the embedded NAD 130 and AHU 160 can be communicatively coupled via a bus 105. The embedded NAD 130 and the AHU 160 can be communicatively coupled over any type of communication link including, but not limited to a wired communication link such as a USB connection, or a wireless communication link such as a Bluetooth communication link or WLAN communication link, etc. An example implementation of the onboard computer system 110 will be described below with reference to FIGS. 2 and 3. As will be described in greater detail below, the AHU 160 includes various infotainment system components that are not illustrated in FIG. 1 for sake of clarity. For instance, among other things, the AHU 160 includes at least one audio system (not illustrated) and at least one display (not illustrated). Further, it is noted that although the embedded NAD 130 and AHU 160 are illustrated as separate blocks that are coupled via the bus 105, in other embodiments, the NAD 130 can be part of the AHU 160.

The NAD 130 is a communication device that is physically and mechanically integrated/embedded within the vehicle 102. The embedded NAD 130 can be used to exchange information over wide area networks 185, such as the Internet. The embedded NAD 130 allows the vehicle 102 to communicate information over-the-air using one or more wireless communication links 170. The embedded NAD 130 allows the onboard computer system 110 including the AHU 160 of the vehicle 102 to communicate with external networks and infrastructure such as the telematics server 190 so that they can communicate and share information with each other. This information can be in the form of packetized data that can include data, control information, audio information, video information, textual information, electronic mail, short message service (SMS) information, multimedia messaging service (MMS) information, etc.

Because the CED 135 is portable it can be present inside the vehicle 102 (e.g., when carried into the vehicle 102 by a person such as the driver, a passenger, or occupant), or can be located outside the vehicle 102. When the CED 135 is located in (or alternatively in communication range of) of the AHU 160, the CED 135 can establish a wired or wireless connection with a wireless interface of the AHU 160. When the CED 135 is located outside the vehicle 102 (e.g., when removed from the vehicle 102), and it moves outside communication range of the wireless interface of the AHU 160 its communication link and connection with the wireless interface of the AHU 160 can be disrupted (e.g., terminated).

The communication infrastructure 180 is communicatively coupled to the telematics server 190 via a NAD 130 through a network 185, such as, the Internet. The communication infrastructure 180 allows the NAD 130 to communicate with the external networks and the remotely located telematics server 190 over wireless communication link(s) 170. Communication infrastructure 180 can generally be any public or private access point that provides an entry/exit point for the NAD 130 (within the vehicle 102) to communicate with an external communication network 185 over wireless communication link(s). Communications that utilize communication infrastructure 180 are sometimes referred to colloquially as vehicle-to-infrastructure, or V2I, communications. Depending on the implementation, the communication infrastructure 180 can be a cellular base station, a WLAN access point, etc. that is in communication with telematics server 190. The communication infrastructure 180 can include, for example, long-range communication nodes (e.g., cellular base stations) and shorter-range communication nodes (e.g., WLAN access points) that are communicatively connected to the communication network 185. Communications between NAD 130 and shorter-range communication nodes are typically facilitated using IEEE 802.x or Wi-Fi®, Bluetooth®, or related or similar standards. Shorter-range communication nodes can be located, for example, in homes, public accommodations (coffee shops, libraries, etc.), and as road-side infrastructure such as by being mounted adjacent a highway or on a building in a crowded urban area.

The communication network 185 can include a wide area network, such as one or more of a cellular telephone network, the Internet, Voice over Internet Protocol (VoIP) networks, local area networks (LANs), wide area networks (WANs), personal area networks (PANs), and other communication networks. Communications from the NAD 130 to the remote telematics server 190, and from the remote telematics server 190 to the NAD 130, can traverse through the communication network 185.

The telematics server 190 is a backend server (or servers) that include computer hardware for implementing the telematics server 190 that can provide information/content that can then be communicated over a network 185, such as the Internet, to communication infrastructure 180. The telematics server 190 can provide services to the vehicle 102 such as Global Positioning System (GPS) services. For example, in some implementations, the telematics server 190 can be associated with a commercial telematics service (e.g., OnStar) that generates information can communicates it over the network 185 to communication infrastructure 180. The information/content provided by the telematics server 190 can include, for example, speed of the vehicle 102 or the CED 135, distance the vehicle 102 or the CED 135 has traveled during a time period, GPS location or coordinates of the vehicle 102 or the CED 135, or any type of information that indicates or can be used to determine the location or position of the CED 135 including information that indicates the location or position of the CED 135 with respect to the vehicle 102. These are some non-limiting example of the types of information that can be generated at the telematics server 190 and then communicated to the communication infrastructure 180. Communication infrastructure 180 then communicates that information or content from the telematics server 190 over a wireless communication link 170 to a NAD 130. This way, the NAD 130 provides wireless connectivity to the telematics server 190 over the wireless communication link 170. In one embodiment, the wireless communication link 170 can be, for example, a third-generation (3G) or fourth generation (4G) communication link.

The NAD 130 can then provide this information to the AHU 160 so that it can be presented on a display (not illustrated) of the vehicle 102. For example, the NAD 130 can communicate the information (e.g., over another communication link 105 such as a wireless communication link or a bus within the vehicle) to a processor (not illustrated in FIG. 1) located in the vehicle 102 that runs/executes a device locator module (not illustrated in FIG. 1) that processes the information from the telematics server 190. The processing performed by the device locator module will be described in greater detail below. The information can be played back via the audio system of the AHU 160 and/or presented (e.g., rendered) on the display(s) of the AHU 160.

Further details regarding this system 100 will now be described below with reference to FIGS. 2-5.

Figure 2:
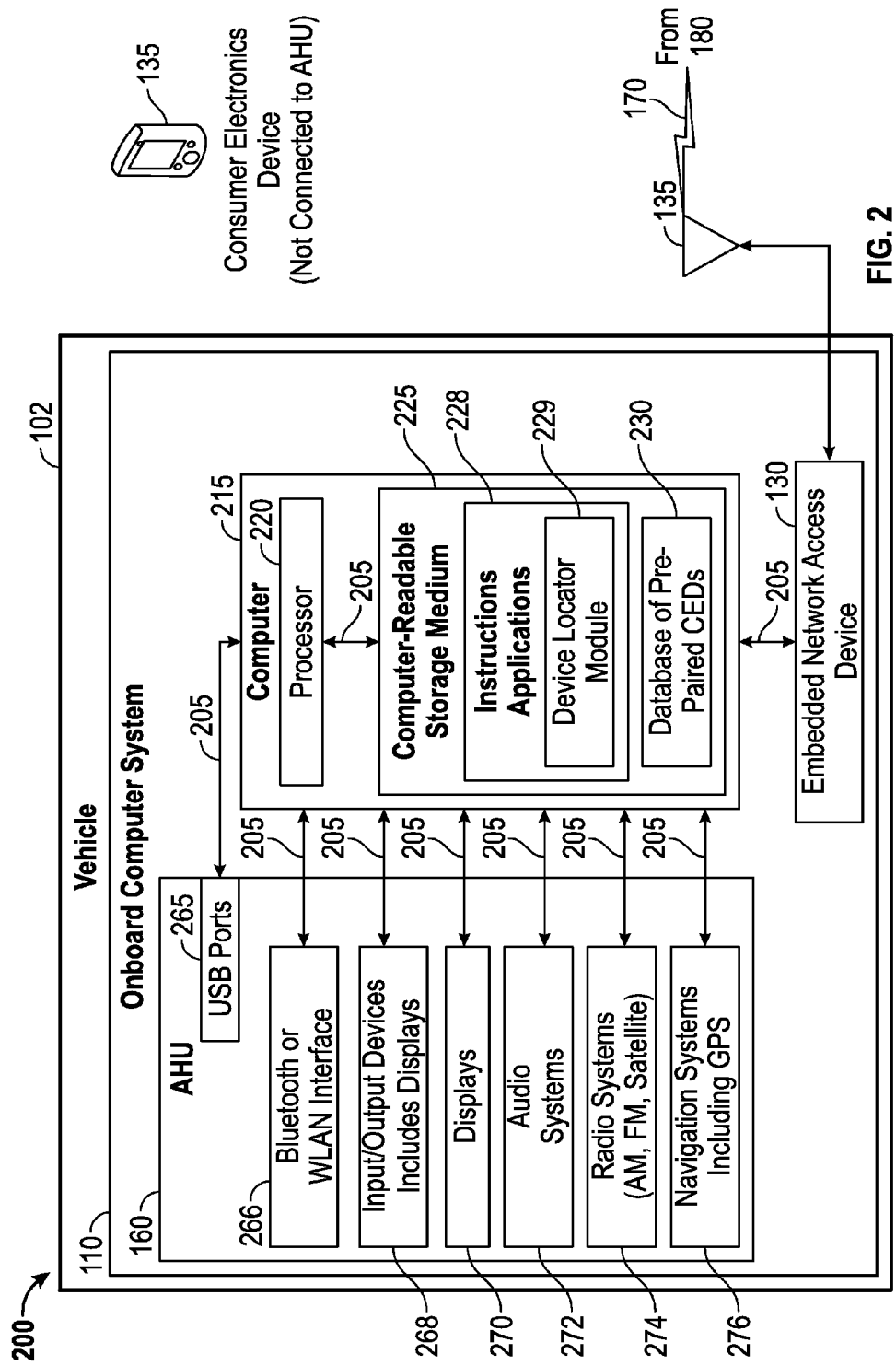
FIG. 2 is a diagram that illustrates a portion of a communication system in accordance with one exemplary implementation of the disclosed embodiments.

FIG. 2 is a diagram that illustrates a portion of a communication system 200 in accordance with one exemplary implementation of the disclosed embodiments. In FIG. 2, the CED 135 is not connected to the AHU 160 of the onboard computer system 110.

In the particular example that is illustrated in FIG. 2, the onboard computer system 110 include the embedded NAD 130, the AHU 160 and a computer 215 that are all coupled together via a bus 205. The bus 205 can include any internal vehicle bus and includes various wired paths that are used to interconnect the various systems and route information between and among the illustrated blocks of FIG. 2.

Although the embedded NAD 130, the AHU 160 and the computer 215 are illustrated as being part of the onboard computer system 110, those skilled in the art will appreciate that the embedded NAD 130, the AHU 160 and the computer 215 (and the various sub-blocks thereof) can separate units that can be distributed throughout the vehicle 102. Thus, although certain blocks are indicated as being implemented with the onboard computer system 110, in other embodiments, any of these blocks can be implemented elsewhere within the vehicle 102 outside the onboard computer system 110.

The computer 215 includes at least one computer processor 220 that is in communication with a tangible, non-transitory computer-readable storage medium 225 (e.g., computer memory) by way of a communication bus 205 or other such computing infrastructure. The processor 220 is illustrated in one block, but may include various different processors and/or integrated circuits that collectively implement any of the functionality described herein. The processor 220 includes a central processing unit (CPU) that is in communication with the computer-readable storage medium 225, and input/output (I/O) interfaces that are not illustrated in FIG. 2 for sake of clarity. In some implementations, these I/O interfaces can be implemented at I/O devices 268, displays 270, and audio systems 272 that are shown within the AHU 160. An I/O interface (not illustrated) may be any entry/exit device adapted to control and synchronize the flow of data into and out of the CPU from and to peripheral devices such as input/output devices 268, displays 270, and audio systems 272.

As will be explained in greater detail below, the processor 220 can receive information from each of the other blocks illustrated in FIG. 2, process this information, and generate communications signals that convey selected information to any of the other blocks illustrated in FIG. 2.

The term computer-readable medium and variants thereof, as used in the specification and claims, refer to any known non-transitory computer storage media that can include any known form of computer-usable or computer-readable medium. The computer-readable (storage) medium 225 can be any type of memory technology including any types of read-only memory or random access memory or any combination thereof. For example, storage media could include any of random-access memory (RAM), read-only memory (ROM), electrically erasable programmable read-only memory (EEPROM), solid state memory or other memory technology, CD ROM, DVD, other optical disk storage, magnetic tape, magnetic disk storage or other magnetic storage devices, and any other medium that can be used to store desired data. The computer-readable (storage) medium 225 encompasses a wide variety of memory technologies that include, for example but not limited to, an electronic, magnetic, optical, electromagnetic, infrared, or semiconductor system, apparatus, device, or propagation medium. Some non-limiting examples can include, for example, volatile, non-volatile, removable, and non-removable memory technologies. For sake of simplicity of illustration, the computer-readable medium 225 is illustrated as a single block within computer 215; however, the computer-readable storage medium 225 can be distributed throughout the vehicle including in any of the various blocks illustrated in FIG. 2, and can be implemented using any combination of fixed and/or removable storage devices depending on the implementation.

The computer-readable storage medium 225 stores instructions 228 that, when executed by the processor, cause the processor 220 to perform various acts as described herein. The computer-readable storage medium 225 stores instructions 228 that can be loaded at the processor 220 and executed to generate information that can be communicated to the AHU 160. The instructions 228 may be embodied in the form of one or more programs or applications (not shown in detail) that may be stored in the medium 225 in one or more modules. While instructions 228 are shown generally as residing in the computer-readable storage medium 225, various data, including the instructions 228 are in some embodiments stored in a common portion of the storage medium, in various portions of the storage medium 225, and/or in other storage media.

The computer-readable storage medium 225 also stores a database 230 of pre-paired CEDs that includes identifier information for each CED that has been paired with the vehicle 102. As will be described in greater detail below, the processor can then use this information to determine which CEDs have been paired with the vehicle 102 when it checks for pre-paired CEDs that are connected to the vehicle 102. As used herein, a "pre-paired CED" is any CED that has been authorized to be paired with the vehicle 102. The pairing can be a unidirectional pairing (e.g., that only the AHU has knowledge of) or a bidirectional pairing (e.g., that both the AHU and the CED(s) have knowledge of). In some implementations, the telematics server 190 can store a list of identifiers associated with paired CED (e.g., subscriber unit identifiers (SUIDs) or electronic serial numbers (ESNs) associated paired devices) that can be provided to the vehicle 102 on a regular basis. Any known means can be used to provide this list to the telematics server 190 including, but not limited to, a secure online service that allows the list to be specified and sent to the vehicle 102. In other implementations, a user, such as the owner of the vehicle 102, can manually enter or scan a list of one or more CEDs into the AHU 160 that are authorized to be paired with the AHU 160. In general, the owner of a pre-paired CED 135 can be anyone who has had their CED paired with the vehicle 102 at the authorization of the owner of the vehicle 102. For example, the owner of the pre-paired CED 135 may be the owner of the vehicle 102 or any other occupant, driver, or passenger that the owner of the vehicle 102 has authorized to pair their CED with the vehicle 102.

The embedded NAD 130, the AHU 160 and the computer 215 are coupled to each other via one or more in-vehicle buses 205 that are illustrated in FIG. 2 by one or more bus line(s) 205. As used herein, the bus 205 can include any internal vehicle bus. The bus 205 includes various wired paths that are used to interconnect the various systems and route information between and among the illustrated blocks of FIG. 2.

The AHU 160 includes various infotainment system components that make up an infotainment system that provides passengers in the vehicle 102 with information and/or entertainment in various forms including, for example, music, news, reports, navigation, weather, and the like, received by way of radio systems, Internet radio, podcast, compact disc, digital video disc, other portable storage devices, video on demand, and the like.

In the example implementation illustrated in FIG. 2, the AHU 160 includes ports 265 (e.g., USB ports), one or more interface(s) 266 (e.g., Bluetooth and/or Wireless Local Area Network (WLAN) interface(s)), one or more input and output devices 268, one or more display(s) 270, one or more audio system(s) 272, one or more radio systems 274 and optionally a navigation system 276 that includes a global positioning system receiver (not illustrated). The input/output devices 268, display(s) 270, and audio system(s) 272 can collectively provide a human machine interface (HMI) inside the vehicle.

The input/output devices 268 can be any device(s) adapted to provide or capture user inputs to or from the onboard computer 110. For example, a button, a keyboard, a keypad, a mouse, a trackball, a speech recognition unit, any known touchscreen technologies, and/or any known voice recognition technologies, monitors or displays 270, warning lights, graphics/text displays, speakers, etc. could be utilized to input or output information in the vehicle 102. Thus, although shown in one block for sake of simplicity, the input/output devices 268 can be implemented as many different, separate output devices 268 and many different, separate input devices 268 in some implementations. As one example, the input/output devices 268 can be implemented via a display screen with an integrated touch screen, and/or a speech recognition unit, that is integrated into the system 160 via a microphone that is part of the audio systems 272. As such, it is noted that the input/output devices 268 (that are not illustrated) can include any of a touch-sensitive or other visual display, a keypad, buttons, or the like, a speaker, microphone, or the like, operatively connected to the processor 220. The input can be provided in ways including by audio input. For instance, the onboard computer system 110 in some embodiments includes components allowing speech-to-data, such as speech-to-text, or data-to-speech, such as text-to-speech conversions. In another case, the user inputs selected information to the device 135, which in turn communicates the information to the onboard computer system by wireless or wired communication.

The displays 270 can include any types and number of displays within the vehicle. For example, the displays 270 can include a visual display screen such as a navigation display screen or a heads-up-display projected on the windshield or other display system for providing information to the vehicle operator. One type of display may be a display made from organic light emitting diodes (OLEDs). Such a display can be sandwiched between the layers of glass (that make up the windshield) and does not require a projection system. The displays 270 can include multiple displays for a single occupant or for multiple occupants, e.g., directed toward multiple seating positions in the vehicle. Any type of information can be displayed on the displays 270 including information that is generated by the server 190 of FIG. 1.

The radio systems 274 can include any known types of radio systems including AM, FM and satellite based radio systems.

The navigation systems 276 can include a global positioning system (GPS) device for establishing a global position of the vehicle. The GPS device includes a processor and one or more GPS receivers that receive GPS radio signals via an antenna (not illustrated). These GPS receivers receive differential correction signals from one or more base stations either directly or via a geocentric stationary or LEO satellite, an earth-based station or other means. This communication may include such information as the precise location of a vehicle, the latest received signals from the GPS satellites in view, other road condition information, emergency signals, hazard warnings, vehicle velocity and intended path, and any other information. The navigation systems 276 can also regularly receive information such as updates to the digital maps, weather information, road condition information, hazard information, congestion information, temporary signs and warnings, etc. from a server. The navigation systems 276 can include a map database subsystem (not illustrated) that includes fundamental map data or information such as road edges, the locations of stop signs, stoplights, lane markers etc. that can be regularly updated information with information from a server. The navigation systems 276 can receive information from various sensors (not illustrated) as is known in the art.

The ports 265 and interfaces 266 allow for external computing devices including the device 135 to connect to the onboard computer system 110 and the AHU 160. In some embodiments, the ports 265 can include ports that comply with a USB standard, and interfaces 266 can include interfaces that comply with a Bluetooth/WLAN standards. This way, the CED 135 can directly communicate (transmit and receive) information with the onboard computer system 110. This information can include data, control information, audio information, video information, textual information, etc.

The embedded NAD 130 and it's associated antenna(s) 135 can be integrated within the vehicle 102. The embedded NAD 130 can be communicatively coupled to various components of an onboard computer system 110 via a wireless or wired connection including via bus 205. For example, the computer 215 of the onboard computer system 110 is communicatively coupled to the embedded NAD 130 via one or more bus line(s) 205.

The NAD 130 can include at least one communication interface and at least one antenna 135, and in many cases can include a plurality of different communication interfaces. These communication interfaces can include one or more wireless communication interfaces that allow the embedded NAD 130 to communicate with communication infrastructure 180. The wireless communication interfaces of the embedded NAD 130 each include at least one transceiver having at least one receiver and at least one transmitter that are operatively coupled to at least one processor. The wireless communication interfaces that are included within the embedded NAD 130 can be implemented using any known wireless communications technologies. The embedded NAD 130 can use communication techniques that are implemented using multiple access communication methods including frequency division multiple access (FDMA), time division multiple access (TDMA), code division multiple access (CDMA), orthogonal frequency division multiple access (OFDMA) in a manner to permit simultaneous communication with communication infrastructure 180 of FIG. 1. While the embedded NAD 130 is illustrated in a single box, it will be appreciated that this box can represent multiple different wireless communication interfaces each of which can include multiple ICs for implementation of the receivers, transmitters, and/or transceivers that are used for receiving and sending signals of various types, including relatively short-range communications or longer-range communications, such as signals for a cellular communications network. The embedded NAD 130 is illustrated as being part of the onboard computer system 110, but can be implemented via one or more separate chipsets.

Depending on the particular implementation, the embedded NAD 130 can include any number of long range wireless communication interfaces and any number of short range wireless communication interfaces.

For example, the embedded NAD 130 can include wireless communication interfaces for relatively short-range communications that employ one or more short-range communication protocols, such as a dedicated short range communication (DSRC) system (e.g., that complies with IEEE 802.11p), a WiFi system (e.g., that complies with IEEE 802.11 a, b, g, IEEE 802.16, WI-FI®), BLUETOOTH®, infrared, IRDA, NFC, the like, or improvements thereof). The NAD 130 can include communication interfaces that allow for short-range communications with other devices (such as CED 135) and with other vehicles (not illustrated) (e.g., that allow the vehicle 102 to communicate directly with one or more other vehicles as part of an ad-hoc network without relying on intervening infrastructure, such as node 180). Such communications are sometimes referred to as vehicle-to-vehicle (V2V) communications. The DSRC standards, for instance, facilitate wireless communication channels specifically designed for automotive vehicles so that participating vehicles can wirelessly communicate directly on a peer-to-peer basis with any other participating vehicle. In one embodiment, at least one communication interface of the embedded NAD 130 is configured as part of a short-range vehicle communication system, and allows the vehicle 102 to directly communicate (transmit and receive) information with other nearby vehicles (not illustrated).

Likewise, the embedded NAD 130 can include wireless communication interfaces for longer-range communications such as cellular and satellite based communications that employ any known communications protocols. In one embodiment, one of the wireless communication interfaces of the embedded NAD 130 is configured to communicate over a cellular network, such as a third generation (3G) or fourth generation (4G) cellular communication network.

The embedded NAD 130 can enable the vehicle to establish and maintain one or more wireless communications links 170 (e.g., via cellular communications, WLAN, Bluetooth, and the like). The physical layer used to implement these wireless communication links can be based on any known or later-developed wireless communication or radio technology. In some embodiments, the wireless communication links can be implemented, for example, using one or more of Dedicated Short-Range Communications (DSRC) technologies, cellular radio technology, satellite-based technology, wireless local area networking (WLAN) or WI-FI® technologies such as those specified in the IEEE 802.x standards (e.g. IEEE 802.11 or IEEE 802.16), WIMAX®, BLUETOOTH®, near field communications (NFC), the like, or improvements thereof (WI-FI is a registered trademark of WI-FI Alliance, of Austin, Tex.; WIMAX is a registered trademark of WiMAX Forum, of San Diego, Calif.; BLUETOOTH is a registered trademark of Bluetooth SIG, Inc., of Bellevue, Wash.).

The embedded NAD 130 can perform signal processing (e.g., digitizing, data encoding, modulation, etc.) as is known in the art.

Consumer Electronics Device

The CED 135 (also referred to below simply as a device 135) can be any type of electronics device that is capable of wireless communication with a network, and includes elements such as a transceiver, computer readable medium, processor, and a display that are not illustrated since those elements are known in the art. The CED 135 can be, for example, any number of different portable wireless communications devices, such as personal or tablet computers, cellular telephones, smartphones, etc.

In the embodiment of FIG. 2, the CED 135 is a smartphone. In this regard, it is noted that as used herein, a smartphone refers to a mobile telephone built on a mobile operating system with more advanced computing capability and connectivity than a feature phone. In addition to digital voice service, a modern smartphone has the capability of running applications and connecting to the Internet, and can provide a user with access to a variety of additional applications and services such as text messaging, e-mail, Web browsing, still and video cameras, MP3 player and video playback, etc. Many smartphones can typically include built in applications that can be provide web browser functionality that can be used display standard web pages as well as mobile-optimized sites, e-mail functionality, voice recognition, clocks/watches/timers, calculator functionality, personal digital assistant (PDA) functionality including calendar functionality and a contact database, portable media player functionality, low-end compact digital camera functionality, pocket video camera functionality, navigation functionality (cellular or GPS), etc. In addition to their built-in functions, smartphones are capable of running an ever growing list of free and paid applications that are too extensive to list comprehensively.

Figure 4:
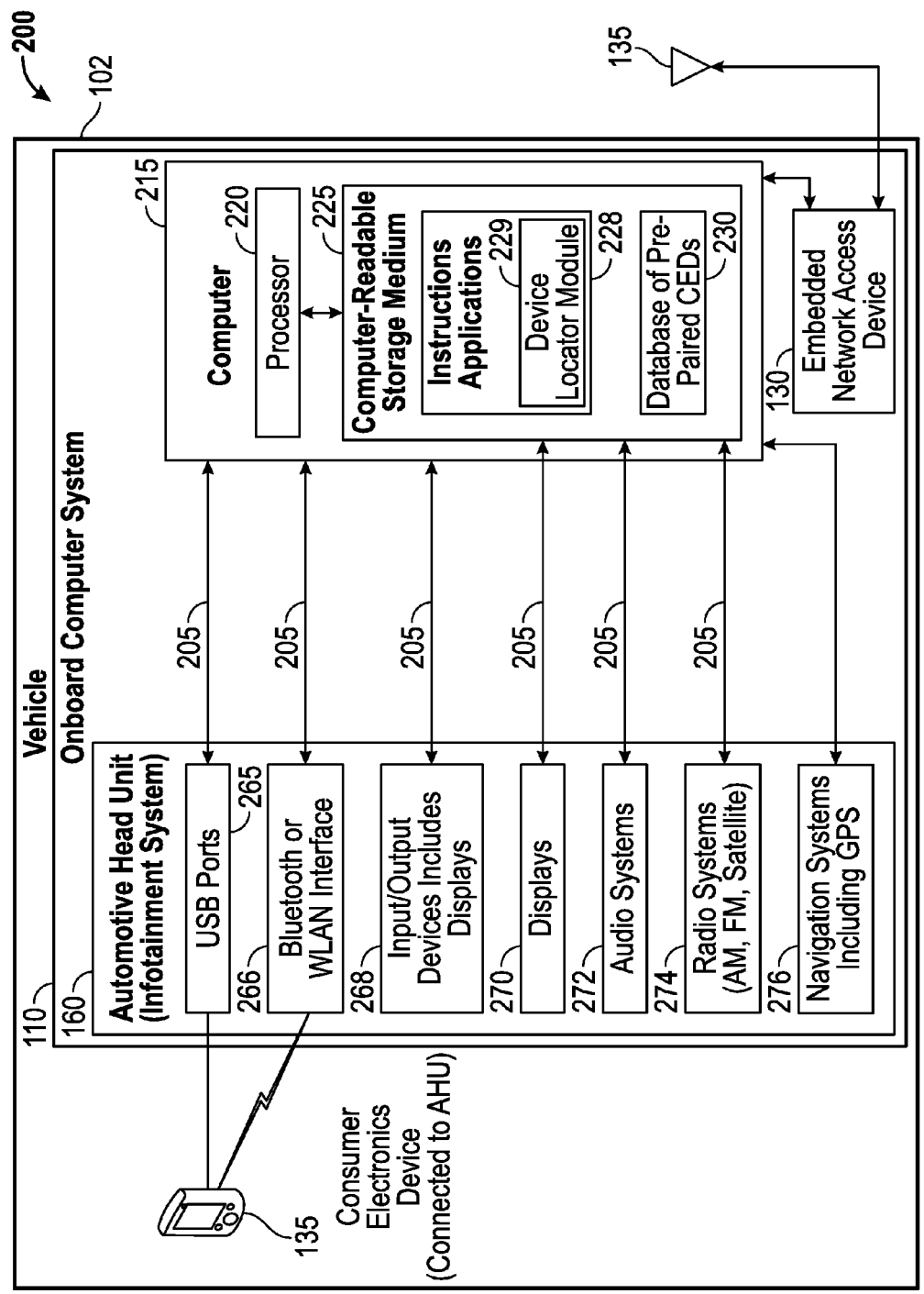
FIG. 4 is a diagram that illustrates a portion of the communication system of FIG. 2 when the CED is connected with the AHU in accordance with one example of the disclosed embodiments.

Because the CED 135 is a portable it can be carried close to the vehicle 102 or far away from the vehicle 102. For instance, as illustrated in FIG. 2, the CED 135 can be far enough away from the vehicle 102 such that it is not possible for it to couple to the USB ports 265 via wired connection or to establish a connection to the wireless interfaces 266. At other times, as is illustrated in FIG. 4, the CED 135 can be carried into the vehicle 102 by an occupant and can then be communicatively coupled to the USB ports 265 via wired connection or can establish a connection to the wireless interfaces 266 of AHU 160 over a short-range wireless communication link. When the CED 135 is coupled to the AHU 160, it can transmit information to the AHU 160 or receive information from the AHU 160 as data packets (e.g., as IP packets) via a USB connection to ports 265 or via a Bluetooth or WLAN link to corresponding interfaces 266.

The CED 135 is Bluetooth-enabled meaning that it includes a Bluetooth antenna and a Bluetooth chipset having a Bluetooth controller and a host (not illustrated in FIG. 1) as defined in the any of the Bluetooth communication standards that are incorporated by reference herein. The Bluetooth chipset generates signals to be transmitted via the Bluetooth antenna, and also receives signals transmitted from other Bluetooth-enabled interfaces via their Bluetooth antennas. In this regard, it is noted that the CED 135 and the Bluetooth interface 266 both include a Bluetooth antenna (not illustrated) and one or more Bluetooth chipset(s) (not illustrated) so that they are capable of implementing all known Bluetooth standards and protocols including a Bluetooth Low Energy (BLE) protocol. Bluetooth technical specifications are developed and published by the Bluetooth Special Interest Group (SIG). Bluetooth Core Specification Version 4.0, adopted Jun. 30, 2010, Core Specification Supplement (CSS) v1 adopted Dec. 27, 2011, Core Specification Addendum (CSA) 2 adopted Dec. 27, 2011, Core Specification Supplement (CSS) v2 adopted Jul. 24, 2012, and Core Specification Addendum (CSA) 3 adopted Jul. 24, 2012, describe various features of the BLE standards, and are incorporated by reference herein in their entirety. Copies of any of the incorporated Core Specifications, including the Bluetooth Specification Version 4.0, can be obtained from the Bluetooth Special Interest Group (SIG) by contacting them in writing at Bluetooth Special Interest Group, 5209 Lake Washington Blvd NE, Suite 350, Kirkland, Wash. 98033, USA, or by visiting their website and downloading a copy. Bluetooth Core Specification Version 4.0 includes Classic Bluetooth, Bluetooth High Speed (HS) protocols and Bluetooth Low Energy (BLE).

The Bluetooth interface 266 is also Bluetooth enabled as described above with reference to the CED 135. Further, in one embodiment, the Bluetooth interface 266 (or alternatively the processor 230) includes a signal processing module that is configured to process or determine signal strength information from signals that are communicated from the CED 135 to determine the proximity of the CED 135 to the vehicle (e.g., to determine the approximate distance between the CED 135 that is the source of those signals and the Bluetooth interface 266 of the AHU 160). For example, in one embodiment, the signal processing module can determine/measure signal strength information (e.g., a received signal strength indicator (RSSI)) associated with signals communicated from the CED 135 and process the signal strength information (e.g., a RSSI) to determine the distance of the CED 135 from the vehicle. In one implementation, the signal processing module can generate a reporting message that includes the signal strength information and approximate distance of the CED 135 from the vehicle 102. In this regard, it is noted that RSSI is just one exemplary metric that can be used to determine distance from the vehicle 102. Alternatively, any other link quality indicators, such as a Bluetooth proximity profile, can be used to determine the distance between the Bluetooth-enabled CED 135 and the Bluetooth interface 266. The proximity profile is defined in the Bluetooth low energy standard. The proximity profile uses a number of metrics including signal strength information, state of the battery charge, whether a device is connected, etc. to characterize the proximity of one BLE enabled device (e.g., the CED 135) to another BLE enabled device (e.g., the Bluetooth interface 266).

The CED 135 can be pre-paired with the AHU 160 meaning that it is pre-authorized to establish the wireless connection with the wireless communication interface 266 and exchange information with the AHU 160. The CED 135 can establish a wireless connection with the wireless communication interface 266 when it is within communication range of the wireless communication interface 266. In one embodiment, the wireless connection is a Bluetooth connection such that the pre-paired CED 135 can connect to the wireless communication interface 266 when it is within Bluetooth communication range.

Device Locator Module

In accordance with the disclosed embodiments, the instructions 228 that are stored in the computer-readable storage medium 225 include a device locator module 229 that includes computer-executable instructions that are executable by the processor 220. In one embodiment, in response to a trigger event (e.g., starting the vehicle 102 and/or activating the AHU 160 or receiving an input at the AHU 160), the device locator module 229 can be loaded and executed at the processor 220 of the vehicle 102. When executed by the processor 220, the device locator module 229 is configured to determine whether the pre-paired CED 135 is connected to the wireless communication interface 266.

When it is determined that the pre-paired CED 135 is not connected to the wireless communication interface 266, the device locator module 229 can to provide a notification to the AHU 160 indicating that the pre-paired CED 135 is not connected. Further, the AHU 160 can generate a signal that indicates that the pre-paired CED 135 is not connected to the wireless communication interface 266, and display a prompt requesting a user input. This user input indicates whether or not the user wants additional information to be obtained that indicates where the pre-paired CED 135 is located with respect to the vehicle.

If the user input indicates that the user wants additional information to be obtained, the device locator module 229 can generate a request message to request that additional information, and can communicate the request message to the wireless communication interface 266 and/or to the embedded NAD 130. In one embodiment, the additional information comprises positional data that specifies the location of the pre-paired CED 135. In one implementation, the embedded NAD 130 can then communicate the request message to the telematics server 190, and the telematics server 190 can relay the request message to the pre-paired CED 135. In response to receiving the request message, the pre-paired CED 135 can determine positional data that specifies the location of the pre-paired CED 135, generate a location message that comprises the positional data, and communicate the location message back to the wireless communication interface 266 and/or to the embedded NAD 130 via the telematics server 190. The embedded NAD 130 and/or the wireless communication interface 266 can then provide the location message to the device locator module 229. The device locator module 229 can process the location message to generate location data and provide the location data to the AHU 160. The AHU 160 includes a display that can be used to present the location data, for example, on a map along with a location of the vehicle to indicate the location of the pre-paired CED 135 with respect to the vehicle.

By contrast, when it is determined that the pre-paired CED 135 is connected to the wireless communication interface 266, the AHU 160 can generate an indicator that indicates that the pre-paired CED 135 is connected to the wireless communication interface 266, and display a prompt for a location request input from a user. The location request input indicates whether or not the user is able to locate the pre-paired CED 135.

When the location request input indicates that the user is not able to locate the pre-paired CED 135, the device locator module 229 can obtain sensor data from the pre-paired CED 135 that provides additional information regarding the location of the pre-paired CED 135. For example, in one embodiment, the device locator module 229 can generate a sensor data acquisition signal (SDAS) to request sensor data from the pre-paired CED 135, and the wireless communication interface 266 and/or the embedded NAD 130 (via the telematics server 190) can transmit the SDAS to the pre-paired CED 135. Here, it is noted that because the pre-paired CED 135 is not connected to the Bluetooth wireless communication interface 266, the WLAN communication interface 266 could still be within WLAN communication range of the pre-paired CED 135, and therefore, if possible, an attempt should be made to directly communicate the SDAS to the pre-paired CED 135 using the WLAN communication interface 266. However, in some scenarios, the pre-paired CED 135 will also be outside WLAN communication range, and therefore, the SDAS should also be communicated to the pre-paired CED 135 using the embedded NAD 130 and telematics server 190. In response to receiving the SDAS, the pre-paired CED 135 can generate and transmit a sensor data signal (SDS) that includes the requested sensor data. The sensor data can be processed to generate the additional information regarding the location of the pre-paired CED 135 with respect to the vehicle.

The wireless communication interface 266 and/or the embedded NAD 130 (via the telematics server 190) can receive the SDS and provide the SDS to the device locator module 229. The device locator module 229 can then process the sensor data to determine the relative location of the pre-paired CED 135 with respect to the vehicle and generate a location signal that provides this location information. The AHU 160 can process the location signal, and display an indication of the relative location of the pre-paired CED 135 with respect to the vehicle 102. In one embodiment, the AHU 160 further comprises a navigation system 276 that provides a user interface (not illustrated) that can be presented on one of the displays 270. The AHU 160 can display the indication of the relative location of the pre-paired CED 135 as a point-of-interest (POI) on a navigation map displayed on the user interface of the navigation system 276 that indicates the position of the pre-paired CED 135 relative to the vehicle, along with a proximity range that indicates an approximate distance of the pre-paired CED 135 from the vehicle 102.

Figure 3:
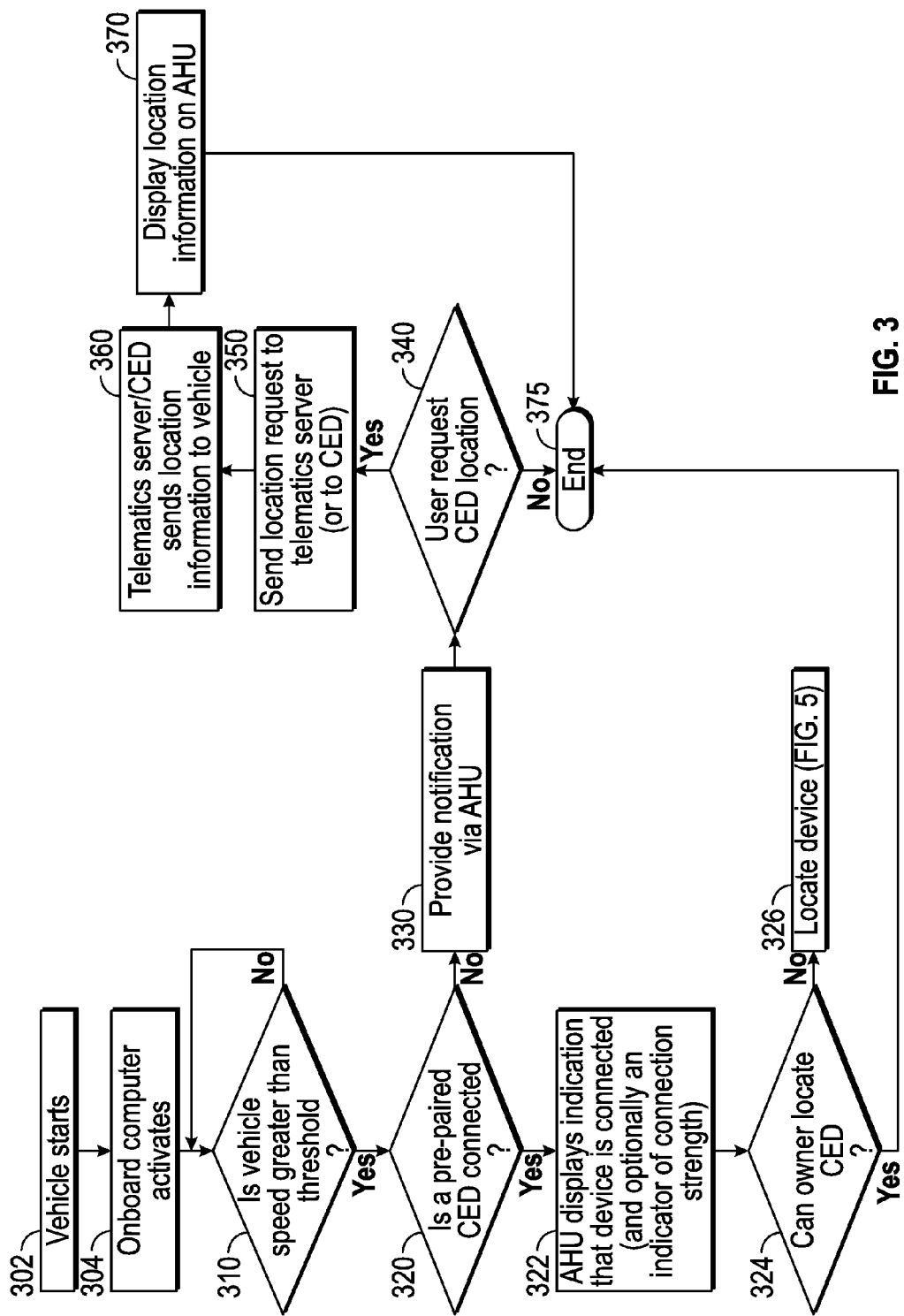
FIG. 3 is a flow chart that illustrates a method for providing a notification at an automotive head unit (AHU) of a vehicle that a consumer electronics device (CED) is outside a vehicle and for providing a location of the CED with respect to the vehicle in accordance with some of the disclosed embodiments.

FIG. 3 is a flow chart that illustrates a method for providing a notification at an automotive head unit (AHU) 160 of a vehicle 102 that a consumer electronics device (CED) 135 is outside a vehicle and for providing a location of the CED 135 with respect to the vehicle 102 in accordance with some of the disclosed embodiments. FIG. 3 will be described with reference to FIGS. 1, 2 and 4. It should be understood that steps of the method 300 are not necessarily presented in any particular order and that performance of some or all the steps in an alternative order is possible and is contemplated. The steps have been presented in the demonstrated order for ease of description and illustration. Further, steps can be added, omitted, and/or performed simultaneously without departing from the scope of the appended claims. It should also be understood that the illustrated method 300 can be ended at any time. In certain embodiments, some or all steps of this process, and/or substantially equivalent steps, are performed by execution of computer-readable instructions stored or included on a computer-readable medium, for example. For instance, references to a processor performing functions of the present disclosure refer to any one or more interworking computing components executing instructions, such as in the form of an algorithm, provided on a computer-readable medium, such as a memory associated with the processor of the onboard computer system 110 of vehicle 102, of the remote server 190, or of a CED 135.

Method 300 begins at block 302 when the vehicle 102 is started and the onboard computer system 110 (and the AHU 160) activates (e.g., turns on or "wakes up") at block 304. In some implementations, a timer or counter can be started (at 304) when the AHU 160 activates, and when a certain time expires or count is reached without the vehicle 102 reaching a speed threshold, the method 300 can automatically end.

At optional block 310, a processor 220 within the onboard computer system 110 then determines whether the speed of the vehicle 102 is greater than a threshold speed. Block 310 is optional in that it is not implemented in all embodiments. When block 310 is implemented, execution of block 310 loops until the speed of the vehicle 102 is greater than a threshold speed (to ensure that the vehicle 102 is in motion) and the method 300 then proceeds to block 320. In some implementations, the speed threshold can be between 1 kilometers per hour and 5 kilometers per hour. This way the method 300 does not proceed to block 320 until the vehicle 102 begins moving, and also helps determine a difference in location between the vehicle 102 and the CED 135. When block 310 is not implemented, the method 300 proceeds to block 320 following block 304 (e.g., after the onboard computer system 110 activates).

At block 320, the processor 220 within the onboard computer system 110 determines whether a pre-paired CED 135 is connected to the AHU 160 of the onboard computer system 110. FIG. 3 illustrates a scenario when the CED 135 is not connected with the AHU 160, whereas FIG. 4 is a diagram that illustrates a portion of the communication system 200 of FIG. 2 when the CED 135 is connected with the AHU 160 in accordance with one example of the disclosed embodiments.

In this context, the term "connected" means that the pre-paired CED 135 and at least one wireless communication interface (e.g., WLAN interface 266 or Bluetooth interface 266 or a wireless interface implemented at the embedded NAD 130) of the onboard computer system 110 have established a connection and are presently in a connected state that allows them to communicate with one another. The "connection" between the pre-paired CED 135 and the onboard computer system 110 can be a wireless point-to-point connection over a short range wireless communication link. For example, as noted above, both the CED 135 and the Bluetooth interface 266 include a Bluetooth antenna and Bluetooth chipset(s) and are capable of implementing all known Bluetooth standards and protocols including a Bluetooth Low Energy (BLE) protocol, and therefore, in one embodiment, the wireless connection can be a Bluetooth or Bluetooth Low Energy (BLE) connection over a Bluetooth or Bluetooth Low Energy (BLE) communication link. In one embodiment, the processor 220 can determine or process signal strength of a signal received from the pre-paired CED 135 to determine whether a pre-paired CED 135 is connected to the onboard computer system 110. In addition, in some implementations in which the pre-paired CED 135 is enabled to establish radio communication with the onboard computer system 110 using near field communication (NFC), the "connection" between the pre-paired CED 135 and the onboard computer system 110 can be detected based on near field communications between the pre-paired CED 135 and the onboard computer system 110. As is known in the art, NFC standards cover communications protocols and data exchange formats that are based on existing radio-frequency identification (RFID) standards including, for example, ISO/IEC 14443 and ISO/IEC 18092 and those defined by the NFC Forum.

Due to the relatively short range over which the CED 135 can establish and maintain a connection with the AHU 160 of the onboard computer system 110, in many cases, when the pre-paired CED 135 is connected to the AHU 160 of the onboard computer system 110, this will indicate that the pre-paired CED 135 is located within the vehicle 102. However, when it is located nearby and within range to establish and maintain a connection with the AHU 160 of the onboard computer system 110, it is possible that the pre-paired CED 135 could be connected to the AHU 160 of the onboard computer system 110 without actually being located in the vehicle 102.

After the processor 220 of the onboard computer system 110 determines (at block 320) that a pre-paired CED 135 is connected to the AHU 160, the processor 220 can generate a connection signal and communicate it to the AHU 160 to indicate that the pre-paired CED 135 is connected to the onboard computer system 110. This connection signal can indicate additional information that characterizes the connection such as an indicator of connection strength (e.g., that is determined based on a RSSI value derived from signals received from the pre-paired CED 135 at the onboard computer system 110), a duration that indicates how long the pre-paired CED 135 has been connected to the onboard computer system 110, etc. The AHU 160 can then display an indicator (e.g., an icon on a display) to indicate that the pre-paired CED 135 is connected to the onboard computer system 110 as well as other information from the connection signal that characterizes the connection.

When the processor 220 of the onboard computer system 110 determines (at block 320) that a pre-paired CED 135 is connected, it is presumed that the pre-paired CED 135 is located within or near the vehicle 102.

Depending on the implementation, following block 322, the method 300 either proceeds to optional block 324 or directly to block 375. In other words, block 324 is optional in that it is not implemented in all embodiments. When block 324 is not implemented, following an affirmative determination at block 320 (e.g., after the onboard computer system 110 determines that a pre-paired CED 135 is connected at block 320) and processing at block 322, the method 300 can simply proceed to block 375 where the method 300 ends. In this case, it is presumed that the pre-paired CED 135 is in the vehicle 102. However, in many scenarios, it may be useful to perform an additional check to confirm that the owner can locate their pre-paired CED 135 and that it is actually within the vehicle 102. For example, in some cases, the owner might have inadvertently left their pre-paired CED 135 outside nearby the vehicle 102 (e.g., sitting on top of the vehicle 102 or on a surface nearly by the vehicle).

However, in embodiments in which block 324 is implemented, a processor 220 within the onboard computer system 110 determines whether the pre-paired CED 135 can be located by its owner (or other person who is at the vehicle 102). For example, in one implementation of block 324, the processor 220 generates a prompt (audio, textual or video) that is presented via the AHU 160. This prompt queries whether the pre-paired CED 135 can be located and waits for an input response that indicates whether or not the pre-paired CED 135 can be (or has been) located.

When the processor 220 receives an input response that indicates that the pre-paired CED 135 can be (or has been) located by its owner (i.e., determines that the pre-paired CED 135 has been located based on an affirmative input response), the method 300 proceeds to block 375 where the method 300 ends.

By contrast, when the processor 220 receives an input response that indicates that the pre-paired CED 135 cannot be located by the owner (e.g., that the CED 135 is connected to the computer system 110, but cannot be located based on a negative input response), the method 300 proceeds to block 326 where additional methods are performed (as will be described below with reference to FIG. 5) to provide further information regarding the location of the pre-paired CED 135. When method 300 proceeds to 326, it has been determined that the pre-paired CED 135 is connected and is therefore within the Bluetooth or Bluetooth Low Energy (BLE) communication range, which means that the pre-paired CED 135 is likely located within or very near the vehicle 102, and therefore additional steps can be performed at block 326 to help the owner of the pre-paired CED 135 locate the pre-paired CED 135. An example of a method that can be performed at block 326 will be described below with reference to FIG. 5.

When the processor 220 of the onboard computer system 110 determines (at block 320) that a pre-paired CED 135 is not connected, it is presumed that the CED 135 is not in the vehicle 102, and the method 300 proceeds to block 330 so that the owner of that pre-paired CED 135 can be notified or informed that the pre-paired CED 135 is not located within the vehicle 102.

At block 330, a processor 220 of the onboard computer system 110 generates one or more notifications to notify the owner of the pre-paired CED 135 that the pre-paired CED 135 is not connected to the vehicle 102. The notification(s) imply that the pre-paired CED 135 is not present within the vehicle 102 although it is possible that the CED 135 could be present, but not powered on, etc. These notifications can be provided, for example, via a display, audio system component, or any other means of notifying the user that the pre-paired CED 135 is not in the vehicle 102. In one embodiment of block 330, the processor 220 can generate signal(s) to communicate one or more indications to the owner (e.g., via the AHU 160) that provide a signal to notify (e.g., alert) the owner that the pre-paired CED 135 is not located within the vehicle 102. For example, these indications can be either an audio indication that is communicated over an audio system, and/or a visual indication or textual indication that is communicated via a display element.

In some embodiments, the method 330 can end at block 330.

In other embodiments, following block 330, after it has been determined that the pre-paired CED 135 is not connected (and thus likely located outside the vehicle 102 somewhere that is outside the WLAN, Bluetooth or BLE communication range), additional steps can be performed (as indicated by optional blocks 340-270) to help the owner of the pre-paired CED 135 locate the pre-paired CED 135.

At block 340, the processor 220 in the onboard computer system 110 generates a prompt asking whether a search for the pre-paired CED 135 is to be performed, and determines whether an input has been received to request that a search for the pre-paired CED 135 is to be performed. For instance, in one implementation, the owner of the CED 135 can request that the location of the pre-paired CED 135 be determined (or searched for) by inputting information using any type of input device including displays, microphones, touchscreens, keyboards, buttons, etc. This could be done by pressing a button on a display, by giving a voice command, or providing any other audio, visual, or user interface input.

When the processor 220 determines (after a time period has elapsed) that an input has not been received (to request that a search for the pre-paired CED 135 be performed), the method 300 ends at block 375.

By contrast, when the processor 220 determines that an input has been received (to request that a search for the pre-paired CED 135 is to be performed), the method 300 proceeds to block 350. Blocks 350, 360, 370 can be performed to determine where the pre-paired CED 135 is located so that the owner of that pre-paired CED 135 can be notified or informed of where that pre-paired CED 135 is located with respect to the vehicle.

At block 350, a device locator module (not illustrated) is executed at the processor 220 (in the onboard computer system 110) to generate and communicate a request message to request that a location search for the pre-paired CED 135 be performed. This request message can be sent via the NAD 130 to the telematics server 190 (and/or alternatively via a wireless communication interface 266 such as WLAN interface) to the pre-paired CED 135). This request message is a request for additional information, such as positional data that specifies the location of the pre-paired CED 135, for example, GPS coordinates of the pre-paired CED 135.

At 360, upon receiving the request message, the pre-paired CED 135 can determine the location of the pre-paired CED 135, and generate a location message that is communicated back to the NAD 130 (and/or to a short-range wireless communication interface 266) of the vehicle 102. The location message can then be provided to the device locator module 229 that is executing at the processor 220 of the vehicle 102, which can then process the location message to generate location data that can be provided the AHU 160. In one embodiment, the application determines the location of the pre-paired CED 135 by performing communications with a location-based services server for the pre-paired CED 135 to obtain positional data that indicates the location of the pre-paired CED 135. In one embodiment, the location message includes positional data that specifies the location of the pre-paired CED 135 via GPS coordinates.

At 370, the AHU 160 can present the location data that indicates the location of the pre-paired CED 135. For example, in one embodiment, at block 370, the location of the pre-paired CED 135 can be communicated using any type of human machine interface (e.g., audio system or display) in any format including as audio location information, textual location information, visual location information. In one implementation, navigation systems of the AHU 160 can present this location data along with location of the vehicle 102 on a map so that the relative location of the pre-paired CED 135 with respect to the vehicle 102 is easy to comprehend in a visual way. Additional information, such as the distance between the pre-paired CED 135 and the vehicle 102, can also be presented to help the owner locate the pre-paired CED 135.

Following block 370, the method 300 either loops back to block 324 or ends at block 375.

Figure 5:
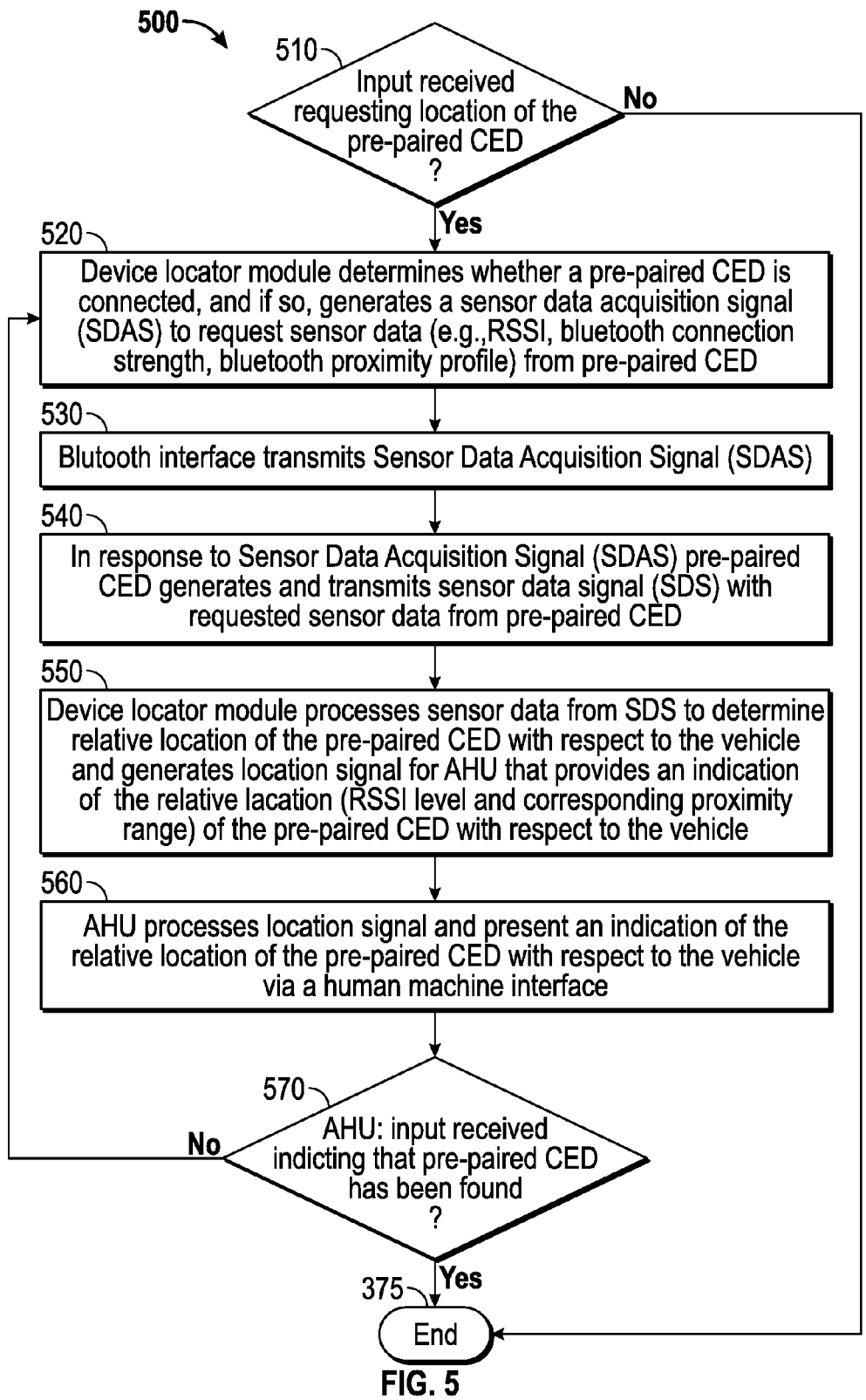
FIG. 5 illustrates a method for locating pre-paired CED when the pre-paired CED is connected to an onboard computer system of the vehicle in accordance with some of the disclosed embodiments.

FIG. 5 illustrates a method 500 for locating pre-paired CED 135 when the pre-paired CED 135 is connected to an onboard computer system 110 of the vehicle in accordance with some of the disclosed embodiments. It should be understood that steps of the method 500 are not necessarily presented in any particular order and that performance of some or all the steps in an alternative order is possible and is contemplated. The steps have been presented in the demonstrated order for ease of description and illustration. Further, steps can be added, omitted, and/or performed simultaneously without departing from the scope of the appended claims. It should also be understood that the illustrated method 500 can be ended at any time. In certain embodiments, some or all steps of this process, and/or substantially equivalent steps, are performed by execution of computer-readable instructions stored or included on a computer-readable medium, for example. For instance, references to a processor performing functions of the present disclosure refer to any one or more interworking computing components executing instructions, such as in the form of an algorithm, provided on a computer-readable medium, such as a memory associated with the processor of the onboard computer system 110 of vehicle 102, of the remote server 190, or of a CED 135. In addition, it is noted that method 500 can be implemented alone when a CED 135 is connected to and within relatively close proximity of vehicle 102 and a user submits an input request to locate the CED 135, or can be implemented in conjunction with method 300 of FIG. 3. For example, when the processor 220 determines that the CED 135 is connected to the onboard computer system 110 (e.g., as illustrated in FIG. 4), but receives a negative input response (at 324 of FIG. 3) that indicates that the pre-paired CED 135 cannot be located by the owner, method 500 that can be implemented at block 326 of FIG. 3 to provide the owner with further information regarding the location of the pre-paired CED 135 to help the owner of the pre-paired CED 135 locate the pre-paired CED 135.

Method 500 begins at block 510 when the processor 220 within the onboard computer system 110 determines whether a location request input was received via the AHU 160 that requests the location of the pre-paired CED 135. The location request input can be input via the owner of the pre-paired CED 135 or anyone else with access to an input device that communicates with the onboard computer system 110. As one non-limiting example, a user can enter an input at step 510 when they discover that their CED 135 is missing or when they receive a notification that their CED 135 is connected to the vehicle 102, but they discover that they are unable to locate their CED 135. When the processor 220 determines that a location request input has not been received, the method 500 can continue to repeat block 510 for a pre-determined period or count, and then end at block 325 when that pre-determined period or count is reached.

When the processor 220 determines that a location request input has been received to request the location of the pre-paired CED 135, the method 500 proceeds to block 520 where a device locator module 229 is launched and executed by the processor 220. At block 520, the device locator module 229 (that is executing at the processor 220) determines whether the pre-paired CED 135 is still connected, and if so, generates a sensor data acquisition signal (SDAS) to request sensor data from the pre-paired CED 135. In general, the sensor data that is to be acquired from the pre-paired CED 135 can include things such as passive information, such as a signal strength indicator, or active information, such as information being generated from sensors within the CED 135. The sensor data can be one or more of several different types of sensor data that can be provided from the pre-paired CED 135. In some embodiments, the SDAS can be used to request different types or combinations of different types of sensor data (from various different sensors of the pre-paired CED 135) that can be processed to generate an indication of the likely location of the pre-paired CED 135.

In one implementation of block 520, the SDAS can be a request message for the CED 135 to send a received signal strength indicator or some other indication of connection strength to the device locator module 229. For instance, in one embodiment, the sensor data can be a RSSI that is determined based on the received signal strength of a signal transmitted from the vehicle 102 such as the SDAS.

In another embodiment, the sensor data can be other link quality indicators that can be used to determine the distance between the pre-paired CED 135 and the Bluetooth interface 266 of the vehicle 102. As one example, the sensor data can be a Bluetooth proximity profile that provides an indication of the distance between the pre-paired CED 135 and the Bluetooth interface 266 of the vehicle 102.

In another embodiment, the sensor data can include audio information from an audio sensor that is integrated the pre-paired CED 135 such as a microphone. In another embodiment, the sensor data can include image information from a camera or imager that is integrated the pre-paired CED 135 (e.g., a picture taken by the camera if its current surroundings that could help determine its current location).

In another embodiment, the sensor data can include environmental information (e.g., external temperature from a temperature sensor, information from a magnetic sensor) In other embodiment, the sensor data can include velocity, direction, acceleration, names of proximal networks sensed from a scan, names of existing paired connections, barometric data from a barometric sensor, data from a gyroscope, etc.

At block 530, the embedded NAD and/or a wireless communication interface 266 of the onboard computer system 110, such as a Bluetooth or WLAN interface 266, can transmit the SDAS.

In response to receiving the SDAS, at block 540, the pre-paired CED 135 generates a sensor data signal (SDS) that includes the requested sensor data, and transmits the SDS over-the-air. In one implementation of block 540, the SDS can be a response message from the pre-paired CED 135 that includes a received signal strength indicator or some other indication of connection strength. The SDS can be received by the embedded NAD and/or a wireless communication interface 266 of the onboard computer system 110, and provided to the device locator module 229.

At block 550, the device locator module 229 processes the sensor data from the SDS to determine the relative location of the pre-paired CED 135 with respect to the vehicle 102, and generates a location signal that is sends to the AHU 160. The location signal provides an indication of the relative location (e.g., proximity range) of the pre-paired CED 135 with respect to the vehicle 102.

At block 560, the AHU 160 processes the location signal and presents an indication of the relative location of the pre-paired CED 135 with respect to the vehicle 102 via a human-machine interface (HMI) of the AHU 160, such as a display or audio system of the AHU 160. For instance, in one implementation of block 560, a display of the AHU can present information that indicates a proximity range of the pre-paired CED 135 to the vehicle 102 along with other information such as a received signal strength level. The proximity range can be determined from a module that is stored in memory and executed at the processor 220. This module can be used to determine, based on a particular signal strength value, a corresponding, approximate distance of the pre-paired CED 135 from the vehicle 102.

At block 570, the AHU 160 provides a prompt via a human-machine interface (HMI) of the AHU 160 to determine whether or not the pre-paired CED 135 has been found, and waits for an input from a user. When the input from the user indicates that the pre-paired CED 135 has not been found/located, the method 500 can loop back to block 520. By contrast, when the input from the user indicates that the pre-paired CED 135 has been found/located, the method 500 can end at block 375.

The foregoing description has been presented for purposes of illustration and description, but is not intended to be exhaustive or limit the scope of the claims. The embodiments described above are described to best explain one practical application, and to enable others of ordinary skill in the art to understand the invention for various embodiments with various modifications as are suited to the particular use contemplated.

In some instances, well-known components, systems, or methods have not been described in detail in order to avoid obscuring the present disclosure. Therefore, specific operational and functional details disclosed herein are not to be interpreted as limiting, but merely as a representative basis for teaching one skilled in the art.

Those of skill in the art would further appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

While the description above includes a general context of computer-executable instructions, the present disclosure can also be implemented in combination with other program modules and/or as a combination of hardware and software. The terms "application," "algorithm," "program," "instructions," or variants thereof, are used expansively herein to include routines, program modules, programs, components, data structures, algorithms, and the like, as commonly used. These structures can be implemented on various system configurations, including single-processor or multiprocessor systems, microprocessor-based electronics, combinations thereof, and the like. Although various algorithms, instructions, etc. are separately identified herein, various such structures may be separated or combined in various combinations across the various computing platforms described herein.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

The block diagrams in the Figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that, in some alternative implementations, the functions noted in the block may occur out of the order noted in the figures. It will also be noted that each block of the block diagrams and/or flowchart illustration, and combinations of blocks in the block diagrams can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

The detailed description provides those skilled in the art with a convenient road map for implementing the exemplary embodiment or exemplary embodiments. Many modifications and variations will be apparent to those of ordinary skill in the art without departing from the scope and spirit of the invention.

The above-described embodiments are merely exemplary illustrations of implementations set forth for a clear understanding of the principles of the disclosure. The exemplary embodiments are only examples, and are not intended to limit the scope, applicability, or configuration of the disclosure in any way. While exemplary embodiments have been presented in the foregoing detailed description, it should be appreciated that a vast number of variations exist. Variations, modifications, and combinations may be made to the above-described embodiments without departing from the scope of the claims. For example, various changes can be made in the function and arrangement of elements without departing from the scope of the disclosure as set forth in the appended claims and the legal equivalents thereof. All such variations, modifications, and combinations are included herein by the scope of this disclosure and the following claims.

What is claimed is:

1. A system for providing notification that a pre-paired consumer electronics device (CED) is located outside a vehicle and for providing a location of the CED with respect to the vehicle, the system comprising:
 an onboard computer system of the vehicle, comprising:
  an automotive head unit (AHU) comprising: a wireless communication interface configured to establish a wireless connection with the pre-paired CED when in communication range of the pre-paired CED;
  a processor configured to execute a device locator module, the device locator module comprising computer-executable instructions that when executed by the processor are configured to:

determine whether the pre-paired CED is connected to the wireless communication interface; and when it is determined that the pre-paired CED is not connected to the wireless communication interface: provide a notification to the AHU indicating that the pre-paired CED is not connected.

2. A system according to claim 1, when it is determined that the pre-paired CED is not connected to the wireless communication interface, wherein the AHU is further configured to:

generate a signal that indicates that the pre-paired CED is not connected to the wireless communication interface; and display a prompt requesting a user input that indicates whether or not additional information is to be obtained that indicates where the pre-paired CED is located with respect to the vehicle.

3. A system according to claim 1, wherein the vehicle further comprises:

an embedded network access device (NAD); and when it is determined that the pre-paired CED is not connected to the wireless communication interface, wherein the computer-executable instructions of the device locator module, when executed by the processor, are further configured to:

generate a request message to request that additional information be obtained that indicates where the pre-paired CED is located with respect to the vehicle, wherein the additional information comprises: positional data that specifies the location of the pre-paired CED;

communicate the request message to at least one of the wireless communication interface and the embedded NAD, and wherein at least one of the wireless communication interface and the embedded NAD is configured to communicate the request message to the pre-paired CED.

4. A system according to claim 3, wherein the pre-paired CED is configured to:

in response to receiving the request message, determine positional data that specifies the location of the pre-paired CED, generate a location message that comprises the positional data, and communicate the location message to at least one of the wireless communication interface and the embedded NAD;

wherein the embedded NAD is further configured to provide the location message to the device locator module; and wherein the computer-executable instructions of the device locator module when executed by the processor are further configured to: process the location message to generate location data and provide the location data to the AHU.

5. A system according to claim 4, wherein the AHU is further configured to:

present, via a display, the location data that indicates the location of the pre-paired CED on a map along with a location of the vehicle.

6. A system according to claim 1, when it is determined that the pre-paired CED is connected to the wireless communication interface, wherein the AHU is further configured to:

generate an indicator that indicates that the pre-paired CED is connected to the wireless communication interface, wherein the AHU is configured to display a prompt for a location request input from a user, wherein the location request input indicates whether the user is able to locate the pre-paired CED.

7. A system according to claim 6, when the location request input indicates that the user is not able to locate the pre-paired CED, wherein the computer-executable instructions of the device locator module, when executed by the processor, are further configured to:

obtain sensor data from the pre-paired CED that provides additional information regarding the location of the pre-paired CED; and process the sensor data to determine the relative location of the pre-paired CED with respect to the vehicle to generate a location signal that provides location information regarding relative location of the pre-paired CED with respect to the vehicle.

8. A system according to claim 7, wherein the computer-executable instructions of the device locator module, when executed by the processor, are configured to obtain sensor data from the pre-paired CED that provides additional information regarding the location of the pre-paired CED by:

generating a sensor data acquisition signal (SDAS) to request sensor data from the pre-paired CED, wherein the sensor data can be processed to generate the additional information regarding the location of the pre-paired CED with respect to the vehicle; and wherein at least one of the wireless communication interface and the embedded NAD is configured to transmit the SDAS; and wherein the pre-paired CED is configured to generate a sensor data signal (SDS) in response to receiving the SDAS and transmit the SDS, wherein the SDS comprises the requested sensor data.

9. A system according to claim 7, wherein the AHU further comprises a navigation system that provides a user interface, and wherein the AHU is further configured to:

process the location signal, and display an indication of the relative location of the pre-paired CED with respect to the vehicle, wherein the indication comprises: a point-of-interest (POI) on a navigation map displayed on the user interface of the navigation system that indicates the position of the pre-paired CED relative to the vehicle, and a proximity range that indicates an approximate distance of the pre-paired CED from the vehicle.

10. A system according to claim 1, wherein the CED is pre-paired with the AHU such that it is authorized to establish the wireless connection with the wireless communication interface and exchange information with the AHU, wherein the wireless connection is a Bluetooth connection, and wherein the pre-paired CED is connected to the wireless communication interface when the pre-paired CED is within Bluetooth communication range of the wireless communication interface.

11. A computer-implemented method for providing notification that a pre-paired consumer electronics device (CED) is located outside a vehicle and for providing a location of the CED with respect to the vehicle, the computer-implemented method comprising:

determining, at a processor that executes computer-executable instructions of a device locator module in response to a trigger event, whether the pre-paired CED is connected to a wireless communication interface of an automotive head unit (AHU) via a wireless connection; and when it is determined that the pre-paired CED is not connected to the wireless communication interface: providing a notification to the AHU indicating that the pre-paired CED is not connected.

12. A computer-implemented method according to claim 11, when it is determined that the pre-paired CED is not connected to the wireless communication interface, further comprising:
generating a signal at the AHU that indicates that the pre-paired CED is not connected to the wireless communication interface; and
displaying a prompt requesting a user input that indicates whether or not additional information is to be obtained that indicates where the pre-paired CED is located with respect to the vehicle.

13. A computer-implemented method according to claim 11, wherein the vehicle further comprises an embedded network access device (NAD), and when it is determined that the pre-paired CED is not connected to the wireless communication interface, further comprising:
generating, at the processor, a request message to request that additional information be obtained that indicates where the pre-paired CED is located with respect to the vehicle, wherein the additional information comprises: positional data that specifies the location of the pre-paired CED;
communicating the request message from at least one of the wireless communication interface and the embedded NAD to the pre-paired CED;
in response to receiving the request message at the pre-paired CED, determining positional data that specifies the location of the pre-paired CED, and communicating a location message that comprises the positional data to at least one of the wireless communication interface and the embedded NAD;
processing the location message at the device locator module to generate location data;
displaying a map on a display of the AHU that includes the location data that indicates the location of the pre-paired CED on along with a location of the vehicle.

14. A computer-implemented method according to claim 11, when it is determined that the pre-paired CED is connected to the wireless communication interface, further comprising:
generating an indicator at the AHU that indicates that the pre-paired CED is connected to the wireless communication interface; and
displaying a prompt for a location request input from a user, wherein the location request input indicates whether the user is able to locate the pre-paired CED.

15. A computer-implemented method according to claim 14, when the location request input indicates that the user is not able to locate the pre-paired CED, further comprising:
obtaining, at the device locator module, sensor data from the pre-paired CED that provides additional information regarding the location of the pre-paired CED; and
processing the sensor data at the device locator module to determine the relative location of the pre-paired CED with respect to the vehicle; and
generating a location signal at the device locator module, wherein the location signal provides location information regarding relative location of the pre-paired CED with respect to the vehicle.

16. A computer-implemented method according to claim 15, wherein the step of obtaining, comprises:
generating a sensor data acquisition signal (SDAS) at the device locator module to request sensor data from the pre-paired CED, wherein the sensor data can be processed to generate the additional information regarding the location of the pre-paired CED with respect to the vehicle;
transmitting the SDAS from at least one of the wireless communication interface and the embedded NAD; and
in response to receiving the SDAS, generating a sensor data signal (SDS) at the pre-paired CED, wherein the SDS comprises the requested sensor data, and
transmitting the SDS.

17. A computer-implemented method according to claim 16, wherein the AHU further comprises a navigation system that provides a user interface, and further comprising:
processing the location signal at the AHU, and
displaying, at the AHU, an indication of the relative location of the pre-paired CED with respect to the vehicle, wherein the indication comprises:
a point-of-interest (POI) on a navigation map that is displayed on the user interface of the navigation system that indicates the position of the pre-paired CED relative to the vehicle, and
a proximity range that indicates an approximate distance of the pre-paired CED from the vehicle.

18. A computer-implemented method according to claim 11, wherein the CED is pre-paired with the AHU such that it is authorized to establish the wireless connection with the wireless communication interface and exchange information with the AHU, wherein the wireless connection is a Bluetooth connection, and wherein the pre-paired CED is connected to the wireless communication interface when the pre-paired CED is within Bluetooth communication range of the wireless communication interface.

19. A vehicle, comprising:
an onboard computer system that is configured to communicate with a pre-paired consumer electronics device (CED), the onboard computer system, comprising:
an automotive head unit (AHU) comprising: a wireless communication interface configured to establish a wireless connection with the pre-paired CED when in communication range of the pre-paired CED;
a processor configured to execute computer-executable instructions to:
determine whether the pre-paired CED is connected to the wireless communication interface; and
when it is determined that the pre-paired CED is not connected to the wireless communication interface:
provide a notification to the AHU indicating that the pre-paired CED is not connected, and
process positional data from a location message provided from the pre-paired CED to generate location data and provide the location data to the AHU.

20. A vehicle according to claim 19, when it is determined that the pre-paired CED is connected to the wireless communication interface and a user is not able to locate the pre-paired CED, wherein the computer-executable instructions of the device locator module, when executed by the processor, are further configured to:
obtain sensor data from the pre-paired CED that provides additional information regarding the location of the pre-paired CED; and
process the sensor data to determine the relative location of the pre-paired CED with respect to the vehicle to generate a location signal that provides location information regarding relative location of the pre-paired CED with respect to the vehicle; and
wherein the AHU is further configured to: process the locator signal, and display an indication of the relative location of the pre-paired CED with respect to the vehicle.

* * * * *